United States Patent
Ray et al.

(10) Patent No.: US 11,885,718 B2
(45) Date of Patent: Jan. 30, 2024

(54) MULTI-FIBER SINGLE LENS OPTICAL ICE DETECTOR

(71) Applicant: Rosemount Aerospace Inc., Burnsville, MN (US)

(72) Inventors: Mark Ray, Burnsville, MN (US); Kaare Josef Anderson, Farmington, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 342 days.

(21) Appl. No.: 16/823,026

(22) Filed: Mar. 18, 2020

(65) Prior Publication Data
US 2021/0293659 A1 Sep. 23, 2021

(51) Int. Cl.
G01M 9/04 (2006.01)
G01N 21/47 (2006.01)
G01N 21/53 (2006.01)

(52) U.S. Cl.
CPC ............ *G01M 9/04* (2013.01); *G01N 21/474* (2013.01); *G01N 21/532* (2013.01); *G01N 2021/4709* (2013.01); *G01N 2021/4742* (2013.01)

(58) Field of Classification Search
CPC ..... G01M 9/04; G01N 21/474; G01N 21/532; G01N 2021/4709; G01N 2021/4742; Y02A 90/10; G01S 7/4818; G01S 7/499; G01S 17/88; G01S 17/95; G01S 7/4802
See application file for complete search history.

(56) References Cited

U.S. PATENT DOCUMENTS 4,327,286 A * 4/1982 Thoma .................. B64D 15/20
                                                340/583
5,748,091 A * 5/1998 Kim ...................... G08B 19/02
                                                340/580
(Continued)

FOREIGN PATENT DOCUMENTS

EP   3351967 A2   7/2018
EP   3783333 A1   2/2021
(Continued)

OTHER PUBLICATIONS

Extended European Search Report dated Jul. 14, 2021, received for corresponding European Application No. 21150769.4, 11 pages.
(Continued)

*Primary Examiner* — Mohamed K Amara
(74) *Attorney, Agent, or Firm* — Kinney & Lange, P.A.

(57) ABSTRACT

A system for determining parameters of a cloud atmosphere within a wind tunnel. The system includes: a light projector configured to project a pulse of light energy into a projection field of view; at least one light detector having a detection field of view that forms a range-limited intersection with the projection field of view, the range-limited intersection having a maximum sampling range so as to exclude wall structures of the wind tunnel, wherein the at least one light detector is configured to detect a backscattered portion of the projected pulse of light energy backscattered from within the range-limited intersection; and a cloud parameter calculator configured to determine parameters of the cloud atmosphere based on the backscattered portions detected.

13 Claims, 6 Drawing Sheets

(56) References Cited

U.S. PATENT DOCUMENTS

| | | | | |
|---|---|---|---|---|
| 6,069,565 | A * | 5/2000 | Stern | B64D 15/20 356/369 |
| 6,302,355 | B1 * | 10/2001 | Sallee | G01S 7/4802 342/63 |
| 6,819,265 | B2 * | 11/2004 | Jamieson | G08B 19/02 340/962 |
| 7,104,502 | B2 * | 9/2006 | Otto | B64D 15/20 340/580 |
| 7,312,713 | B2 * | 12/2007 | Alfano | B64D 15/20 250/341.1 |
| 7,485,862 | B2 * | 2/2009 | Danziger | G01S 17/89 250/339.1 |
| 7,986,408 | B2 * | 7/2011 | Ray | B64D 15/20 356/342 |
| 9,096,323 | B1 | 8/2015 | Ray et al. | |
| 9,116,243 | B1 * | 8/2015 | Brown | G01S 17/18 |
| 9,690,008 | B2 * | 6/2017 | Antikainen | G01W 1/04 |
| 9,983,112 | B1 | 5/2018 | Ray et al. | |
| 10,031,059 | B1 | 7/2018 | Ray et al. | |
| 10,207,810 | B2 | 2/2019 | Anderson et al. | |
| 10,261,006 | B2 | 4/2019 | Ray et al. | |
| 10,444,368 | B2 * | 10/2019 | Ray | G01S 7/499 |
| 10,466,157 | B1 | 11/2019 | Ray et al. | |
| 11,137,519 | B2 * | 10/2021 | Ray | G01S 7/4818 |
| 2002/0075472 | A1 * | 6/2002 | Holton | G01S 7/4818 356/4.01 |
| 2003/0232445 | A1 * | 12/2003 | Fulghum, Jr. | A61B 5/0075 422/82.07 |
| 2006/0126055 | A1 * | 6/2006 | Meneely | G01S 17/87 356/28 |
| 2009/0128798 | A1 * | 5/2009 | Danziger | G01S 7/4818 356/5.01 |
| 2009/0219523 | A1 * | 9/2009 | Morris | G01N 21/65 356/300 |
| 2011/0019188 | A1 * | 1/2011 | Ray | B64D 15/20 356/342 |
| 2011/0181881 | A1 * | 7/2011 | Mathur | G01N 21/21 356/342 |
| 2015/0051498 | A1 * | 2/2015 | Darty | G01J 3/10 600/407 |
| 2015/0070700 | A1 * | 3/2015 | Ray | G01N 21/538 356/342 |
| 2015/0116692 | A1 | 4/2015 | Zuk et al. | |
| 2017/0328833 | A1 * | 11/2017 | Mamidipudi | G01N 21/65 |
| 2018/0024270 | A1 * | 1/2018 | Ray | G01W 1/00 356/336 |
| 2018/0052237 | A1 * | 2/2018 | Ray | B64D 45/00 |
| 2018/0209887 | A1 * | 7/2018 | Ray | B64D 15/20 |
| 2019/0140745 | A1 * | 5/2019 | Sprague | H04B 10/80 |
| 2019/0383735 | A1 * | 12/2019 | Ray | G01S 7/4868 |
| 2021/0011138 | A1 * | 1/2021 | Pan | G01S 7/4817 |
| 2021/0055422 | A1 | 2/2021 | Ray et al. | |
| 2021/0172851 | A1 * | 6/2021 | Lincoln | G01N 15/06 |
| 2021/0293659 | A1 * | 9/2021 | Ray | G01S 17/88 |
| 2023/0081599 | A1 * | 3/2023 | Ray | G01S 17/933 |

FOREIGN PATENT DOCUMENTS

| | | | |
|---|---|---|---|
| WO | 20120105973 | A1 | 8/2012 |
| WO | 2014132073 | A1 | 9/2014 |

OTHER PUBLICATIONS

M. Sxhnaiter, S. Buttner, O. Mohler, J.Skrotzki, M. Vragel, and R. Wagner, Influence of particle size and shape on the backscattering linear depolarisation ratio of small ice crystals—cloud chamber measurements in the context of contrail and cirrus microphysics, 2012, 20 pages, Atmospheric Chemistry and Physics, Germany.

Extended European Search Report dated Feb. 27, 2023, received for corresponding European Application No. 22201347.6, pp. 11.

Kaare J. Anderson et al., SLD and Ice Crystal Discrimination with the Optical Ice Detector, SAE 2010 Commercial Engineering Congress SAE Technical Papers, vol. 1, Jun. 10, 2019, pp. 10.

Extended European Search Report dated Mar. 22, 2023, received for corresponding European Application No. 22200843.5 pp. 7.

Mark D. Ray et al., "Optical Detection of Airborne Ice Crystals and Liquid Water Droplets," AAIA Atmospheric and Space Environments Conference, vol. AIAA 2009-3863, Jun. 22, 2009, pp. 1-15.

Communication pursuant to Article 94(3) EPC for EP Application No.: 21150769.4, dated Sep. 14, 2023, 4 pages.

* cited by examiner

MULTI-FIBER SINGLE LENS OPTICAL ICE DETECTOR

BACKGROUND

Various cloud conditions can present risks to aircraft when traveling through them. If the temperature of a cloud atmosphere is below the freezing point for water, water droplets can become super-cooled liquid droplets. These super-cooled liquid droplets can then undergo a liquid-to-solid phase change upon impact with an aircraft surface. Ice accretes at different surface regions for different sizes of the super-cooled liquid droplets in the cloud atmosphere. Thus, characterizing the sizes of super-cooled water droplets in a cloud atmosphere can facilitate prediction of surface regions where ice will accrete as well as provide alerts of potentially dangerous conditions to a pilot.

Some aircraft are equipped with Light Detection and Ranging (LIDAR) systems to measure cloud metrics, for example. An example of a compact, airborne LIDAR system is an optical ice detector (OID), which is intended to probe the airstream surrounding an aircraft to determine properties of the cloud atmosphere through which the aircraft is passing. The OID projects short pulses of laser light into the surrounding clouds and measures the backscatter as a function of the time-of-flight of a pulse to generate backscatter signals. Backscatter provides an estimate of a characteristic droplet or ice crystal size and the liquid and/or ice water content of the clouds.

Wind tunnel testing is an important means for research and development of various airborne systems, such as, for example, LIDAR systems. A wind tunnel can include a waterdrop spraying system, a refrigeration system, etc. Clouds and mist flow fields can be created to simulate aerial meteorological conditions, so that cloud parameters or conditions can be measured in the wind tunnel.

SUMMARY

A system for determining parameters of a cloud atmosphere within a wind tunnel. The system includes: a light projector configured to project a pulse of light energy into a projection field of view; at least one light detector having a detection field of view that forms a range-limited intersection with the projection field of view, the range-limited intersection having a maximum sampling range so as to exclude wall structures of the wind tunnel, wherein the at least one light detector is configured to detect a backscattered portion of the projected pulse of light energy backscattered from within the range-limited intersection; and a cloud parameter calculator configured to determine parameters of the cloud atmosphere based on the backscattered portions detected.

A system for determining parameters of a cloud atmosphere within a wind tunnel. The system includes: a light projector configured to project a pulse of light energy into a projection field of view; multiple light detectors each having a receiver fiber and a detection field of view that forms a range-limited intersection with the projection field of view, the range-limited intersection having a maximum sampling range so as to exclude wall structures of the wind tunnel, wherein the multiple light detectors are configured to detect a backscattered portion of the projected pulse of light energy backscattered from within the range-limited intersection; a single collimation lens, wherein reception faces of the receiver fibers of the multiple light detectors are arranged along the single collimation lens; and a cloud parameter calculator configured to determine parameters of the cloud atmosphere based on the backscattered portions detected.

A method for determining parameters of a cloud atmosphere within a wind tunnel. The method including the steps of: projecting a pulse of light energy into a projection field of view; detecting a backscattered portion of the projected pulse of light energy backscattered from within a range-limited intersection of at least one detection field of view formed by at least one light detector and the projection field of view, the range-limited intersection having a maximum sampling range so as to exclude wall structures of the wind tunnel; and determining parameters of the cloud atmosphere based on the backscattered portions detected.

DETAILED DESCRIPTION

Systems and associated methods described herein relate to measuring cloud conditions, such as surrounding an aircraft, for example, so as to determine properties of clouds through which the aircraft is passing. During research and development, such systems may first be tested in a wind tunnel (i.e., a cloud chamber). There are challenges to testing a system, which will be used on an aircraft with a sampling range extending many meters, in a wind tunnel that may have relatively small volumes of calibrated cloud conditions. In such a wind tunnel, the maximum sampling range of a chamber in the wind tunnel is limited by a physical barrier, such as a far wall of the chamber. Systems and associated methods described herein include a system for determining parameters of a cloud atmosphere within a wind tunnel. The system includes: a light projector configured to project a pulse of light energy into a projection field of view; at least one light detector having a detection field of view that forms a range-limited intersection with the projection field of view, the range-limited intersection having a maximum sampling range so as to exclude wall structures of the wind tunnel, wherein the at least one light detector is configured to detect a backscattered portion of the projected pulse of light energy backscattered from within the range-limited intersection; and a cloud parameter calculator configured to determine parameters of the cloud atmosphere based on the backscattered portions detected.

The ability to detect backscatter at one light detector that is off-set or displaced by an angle from a projection axis of the projection field of view can reduce or eliminate spatial overlap (or intersection) of the projection field of view and the detection field(s) of view at the far wall of the wind tunnel chamber (i.e., detection field of view forms a range-limited intersection with projection field of view), for example, which prevents strong laser echoes generated by the wall of the wind tunnel from saturating the sensitive light detector that is intended to sense weak backscatter from a cloud. Using multiple light detectors, or receivers, at multiple or increasing off-set displacements or angles, can provide more scattering information, which can allow better characterization of cloud parameters, such as particle size. Systems and methods may include use of a single collimation lens configured to span or extend the breadth of the projection field of view and the detection field(s) of view. Optionally, systems and associated methods described herein can additionally use both circularly and linearly polarized light to better ascertain the shapes of non-spherical particles (such as ice crystals and aerosols) detected in a cloud atmosphere in a wind tunnel.

Figure 1:
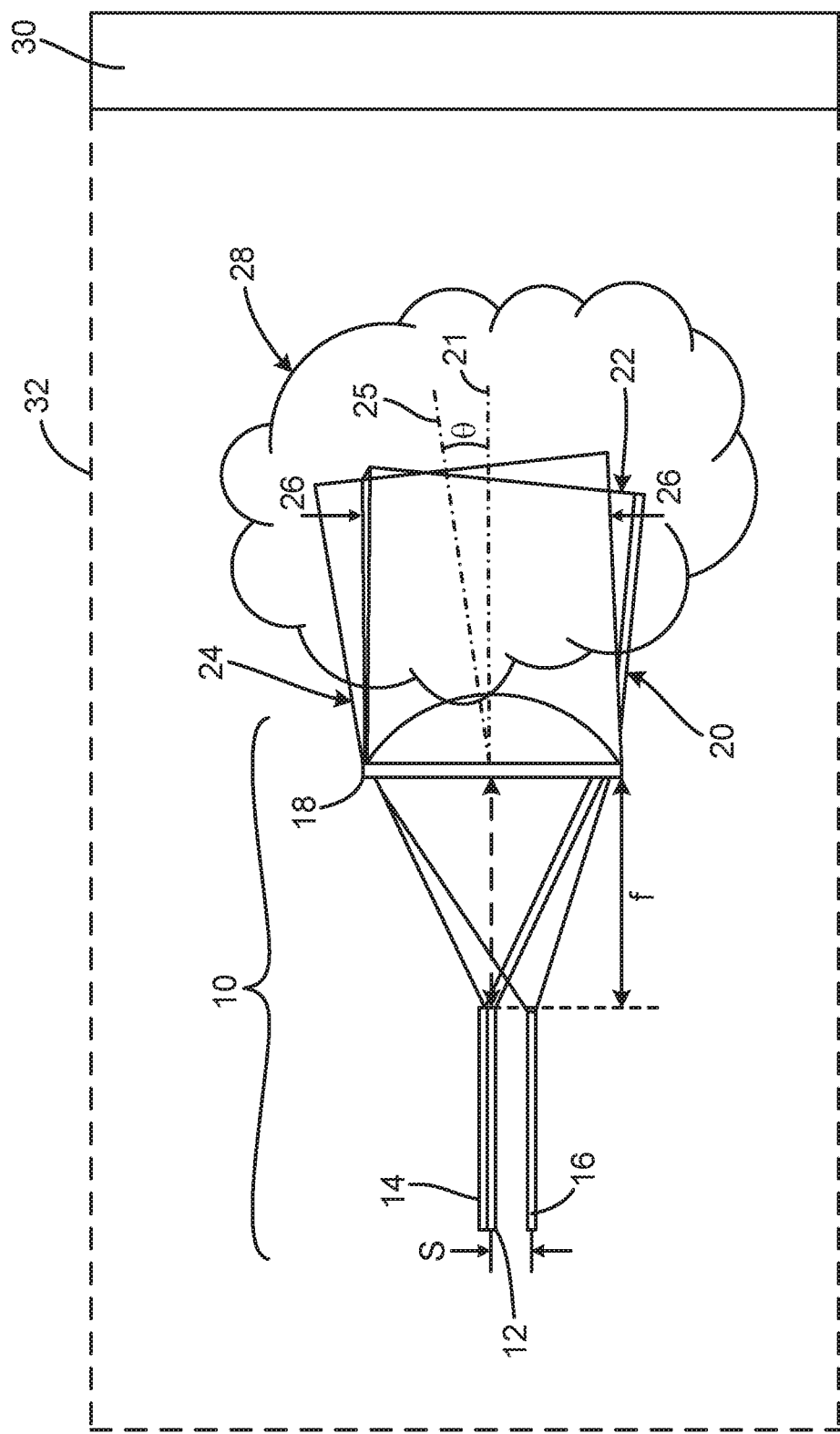
FIG. 1 is a schematic diagram of an embodiment of a cloud conditions measurement system for use in a wind tunnel.

FIG. 1 is a schematic diagram of an embodiment of a cloud conditions measurement system for use in a wind tunnel. Cloud conditions measurement system 10 includes laser transmitter 12, on-axis receiver fiber 14, off-axis receiver fiber 16 and single collimation lens 18 (i.e., a collection/receiver lens). Single collimation lens 18 spans or extends the breadth of projection field of view 20 of laser transmitter 12 aligned about laser projection axis 21 as well as spans the breadth of reception, or detector, fields of view 22, 24 for both on-axis receiver fiber 14 (also aligned about laser projection axis 21) and off-axis receiver fiber 16 (aligned about off-axis reception axis 25), respectively. Due to a limited detection distance in system 10, for example, it is desirable to have a high degree of intersection (i.e., overlap) (indicated by intersection portion 26) between or amongst projection field of view 20, on-axis reception field-of-view 22 and off-axis reception field-of-view 24 at close range regardless of the size of liquid droplets, ice crystals and/or aerosols within cloud atmosphere 28. In other words, receiver fibers 14, 16 have substantially the same field of view as the transmitter fiber 12, in order to receive signals from a volume of cloud atmosphere 28 that is substantially commensurate with a probed volume. System 10 is depicted in FIG. 1 probing cloud atmosphere 28.

System 10 can be used in a wind tunnel, for example. Wall 30 can be a portion of such wind tunnel 32 (with other boundaries of wind tunnel 32 indicated by dashed lines) that can surround system 10 during testing, and that can be a physical barrier to a transmitted laser beam, or projection field of view 20, which can be encountered during use of system 10 in wind tunnel 32. Alternatively, system 10 may be installed on one wall of a wind tunnel looking inward into the wind tunnel.

Figure 2:
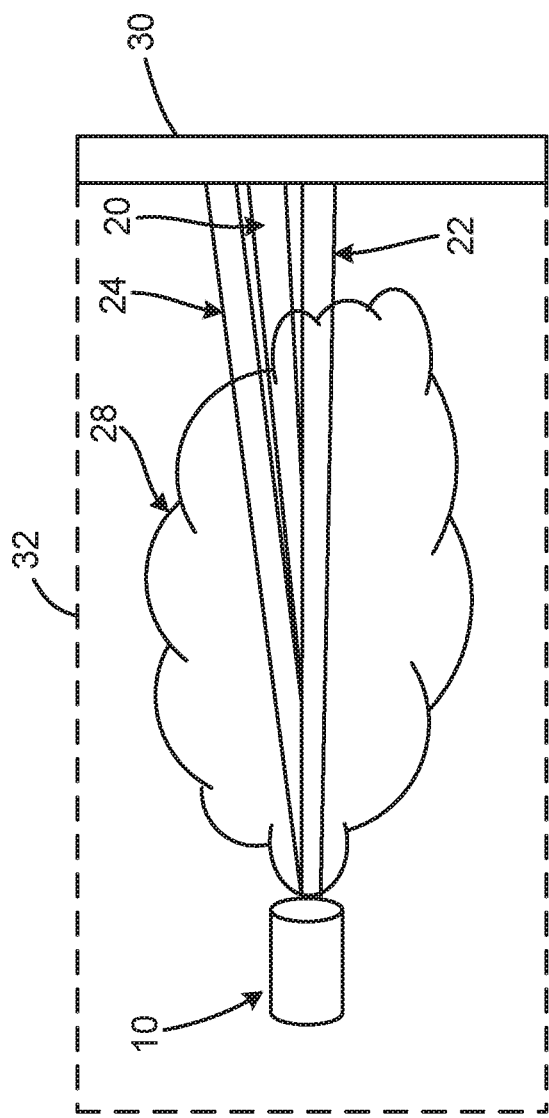
FIG. 2 is another schematic diagram of the cloud conditions measurement system of FIG. 1.

FIG. 2 is another schematic diagram of cloud conditions measurement system 10 of FIG. 1. FIG. 2 illustrates, however, transmission of projection field of view 20 through cloud atmosphere 28 and extending out to wall 30, a physical barrier of wind tunnel 32. As illustrated, at wall 30, there is no overlap of projection field of view 20, on-axis reception field of view 22 or off-axis reception field of view 24. Although at close range for system 10 spatial overlap is desirable (see FIG. 1), a reduction or elimination of spatial overlap between projection field of view 20 (from a laser beam, for example), on-axis receiver field-of-view 22 and off-axis receiver field-of-view 24 beyond a known distance is, for this application, desirable. It prevents strong echoes generated by a solid object, such as wall 30, from saturating sensitive light detectors that are intended to sense weak backscatter from a tenuous cloud. In other words, reduction or elimination of overlap or intersection amongst the fields of view at wall 30 reduces or prevents reflection back of a projected pulse of light along transmitter fiber 12 (FIG. 1), which could make results from wind tunnel testing of system 10 inaccurate. This design philosophy is opposite that for an airborne application, for which it is desirable to have no overlap at an exit aperture of an optical ice detector (OID) (to avoid measurements within a boundary layer of an aircraft) and to have increasing overlap with increasing distance from the aperture (to compensate for the diminution of received backscatter).

As shown in FIG. 2, a distance at which projection field of view 20, on-axis reception field of view 22 and off-axis reception field of view 24 no longer overlap spatially, or intersect, depends on off-set angle (θ) of off-axis receiver field-of-view 24 with respect to projection axis 21 (see FIG. 1 for θ and projection axis 21). With the proper combination of single collimation lens 18 focal length f (shown in FIG. 1) and off-axis receiver fiber 16 displacement S (shown in FIG. 1), it is possible to ensure than none of the receiver fibers (even with on-axis receiver fiber 14 positioned closest to transmitter fiber 12) views reflections from the wall 30, as illustrated in FIG. 2. Transmitter fiber 12, in contrast, is positioned along projection axis 21 of single collimation lens 18 and can receive backscatter and reflections, regardless of distance from the aperture of the laser. The equation for calculation of an off-set, or viewing, angle (θ) of the off-axis receiver fiber 16 is:

$$\theta = S/f \tag{1}$$

Figure 3:
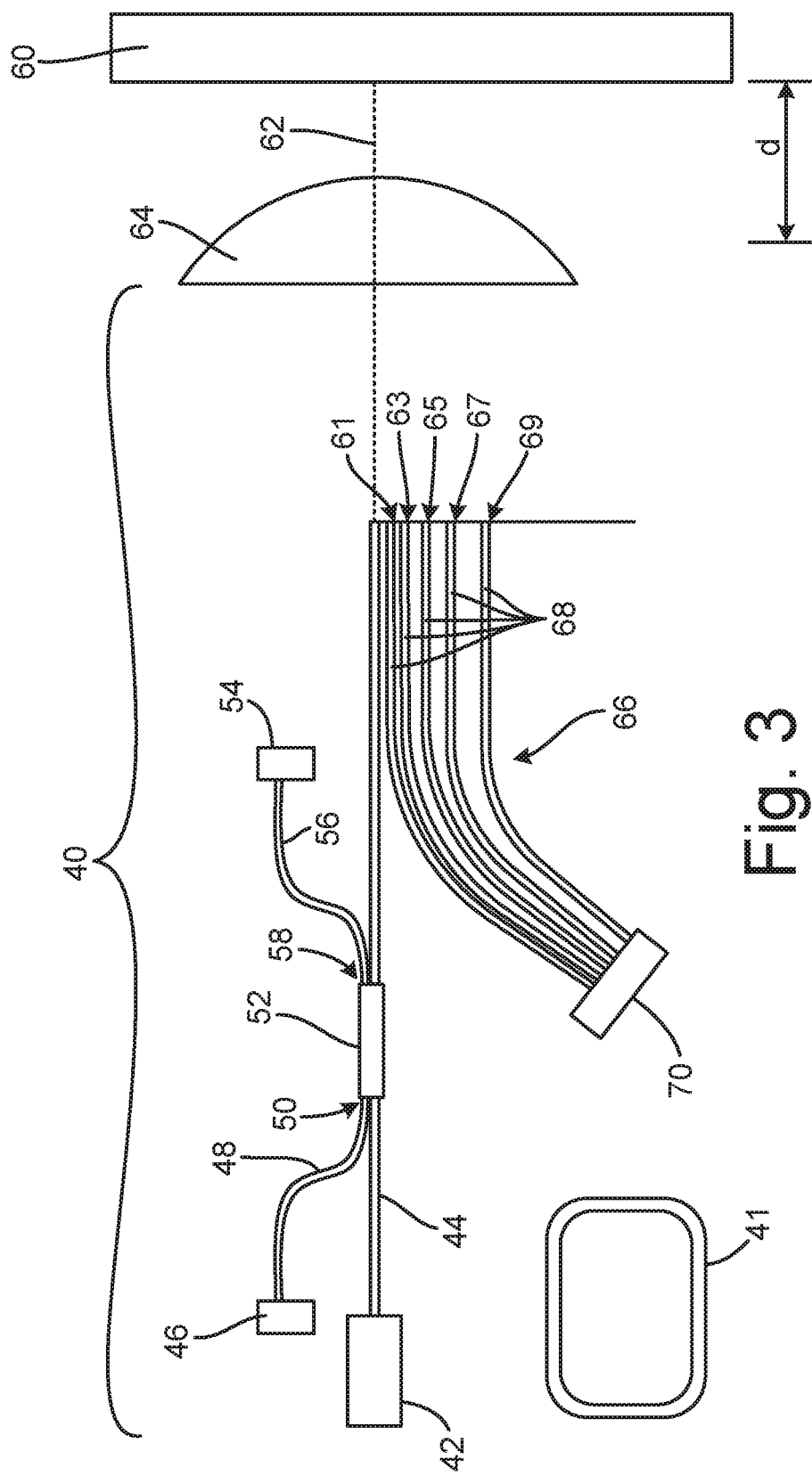
FIG. 3 is a schematic diagram of another embodiment of a cloud conditions measurement system for use in a wind tunnel.

FIG. 3 is a schematic diagram of another embodiment of a cloud conditions measurement system 40 for use in a wind tunnel. System 40 includes laser 42 (e.g., a laser diode) that is connected to transmitter fiber 44. First optical detector 46 is connected via back-reflection fiber 48 to first leg 50 of 2×2 fiber splitter 52, which is also connected to transmitter fiber 44. First optical detector 46 can sample reflections from wind tunnel wall 60 that are reflected back through laser transmitter fiber 44. Second optical detector 54 is attached via laser sampling fiber 56 to second leg 58 of 2×2 fiber splitter 52. Second optical detector 54 can sample an outgoing laser pulse or beam in order to track possible fluctuations in transmitted optical power.

A laser beam (i.e., laser pulse, laser signal or pulse of light) can be sent by laser 42 through transmitter fiber 44 and along projection axis 62. The laser beam (not shown) can pass through single collimation lens 64 before reaching wall 60 and being at least partially reflected back, which is also known as backscatter. The backscattered signal then is collected (e.g., received) by fiber bundle 66, which is made up of a series of individual receiver fibers 68. Receiver fibers 68 can include reception faces 61, 63, 65, 67, 69. Receiver fibers 68 then direct the received light to fiber-coupled detector array 70.

Fiber bundle 66 can be made up of a series of receiver fibers 68 that can detect reflected signals. Receiver fibers 68 can be distributed laterally along a focal plane of single collimation lens 64 and can be described as a series of increasing off-set receiver fibers 68 with respect to projection axis 62 of transmitter fiber 44. Single collimation lens 64 can be a collimator lens having a size that is large enough to accommodate and collimate fields of view, which include a projection field of view of transmitter fiber 44 and reception fields of view of receiver fibers 68. An exemplary size of single collimation lens 64 (or any single collimation lens described herein) can be about 2 inches (5.08 cm) in diameter, although other sizes are also contemplated.

Receiver fibers 68, or detectors, are used for detecting reflected light or signals that can be off-axis from projection axis 62 of transmitter fiber 44. Receiver fibers 68 can be configured and arranged to have increasing offset displacements. As shown, receiver fibers 68 can have non-linear spacing. The spacing of multiple receiver fibers can be arbitrary and may be linearly and/or non-linearly spaced along the lens. Receiver fibers 68 can map a portion of the averaged scattering phase function of a cloud, for example. Detector array 70 can be attached to ends of receiver fibers 68. Fiber bundle 66 can be broken out behind single collimation lens 64. Detector array, or detection system, 60 can be a generic, packaged array of regularly spaced photodetectors coupled to receiver fibers 68, for example, and can be adapted to various reception fields of view by simply repositioning the fiber ends that have been broken out of fiber bundle 66.

Depending on range resolution of system 40 and the breadth of the wind tunnel, only the first few range-resolved bins, which may be 0.6 m wide, may contain backscatter for all of the off-set angles. Measurements can be deemed range-resolved if the frequency response of fiber-coupled light detector array 70 is sufficient to distinguish signals backscattered from various ranges (e.g., various distances) within a probed volume. At longer distances, received signals from the largest off-axis receiver angle drops out first until only the on-axis receiver channel, the signal received by the fiber closest to the laser transmitter fiber 44, remains. At wall 60 of a wind tunnel, even this channel may no longer receive reflected light from the transmitted laser beam. Hence, at each range-resolved bin there is a collection of angular scattering measurements which can characterize the typical size of droplets or ice crystals in the clouds. In combination with the extinction measurement(s) described below, these angularly resolved backscatter measurements characterize the typical droplet size and the water content of the sampled cloud. Furthermore, for the on-axis channel, in the case that there are a sufficient number of range-resolved backscatter measurements, a second extinction measurement is feasible. When it is compared to the first measurement from the laser reflection fiber 48, it can corroborate the estimated extinction and/or detect spatial non-uniformity of a cloud.

As shown in FIG. 3, distanced is from lens 64 to wall 60. Changes in the intensity of a reflected signal I from wall 60 before and after the introduction of a cloud atmosphere into a chamber enclosing system 40 enables a calculation of average cloud extinction α using the following equation:

$$\alpha = -\ln\left(\frac{I_{after}}{I_{before}}\right) / 2d \qquad (2)$$

A sample of a transmitted laser pulse allows correction of $I_{after}$ for fluctuations in transmitted laser power. Measuring average cloud extinction or decay can be beneficial in a small wind tunnel for which there are not enough range-resolved measurements to perform a reliable fit of extinction in cloud backscatter to an exponential curve. In the case that there are enough range-resolved measurements, this direct reflection from laser 42 will also exhibit a decay characteristic of cloud attenuation over a full sampling depth within a wind tunnel.

A cloud parameter calculator, for example, a computer processing unit (CPU) (41 in FIG. 3) can be included in system 40 to determine parameters of the cloud atmosphere based on the backscattered portions detected. CPU 41 can be connected remotely (as shown) or directly to detectors, sensors, and the like in system 40. CPU 41 may calculate cloud parameters.

Figure 3B:
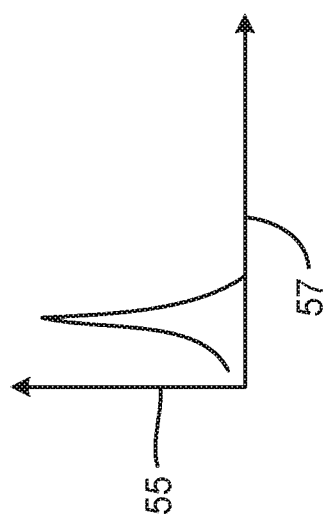
FIG. 3b is an exemplary graph of intensity of transmitted laser beam intensity versus time for the cloud conditions measurement system of FIG. 3.
Figure 3A:
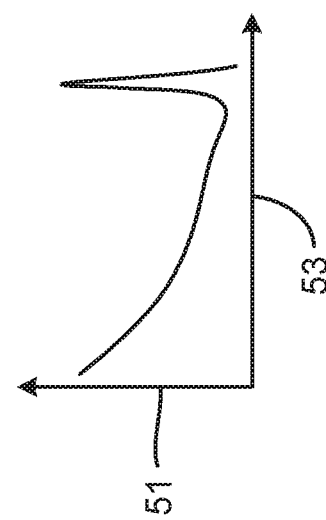
FIG. 3a is an exemplary graph of intensity of backscatter versus time for the cloud conditions measurement system of FIG. 3.

FIG. 3*a* is an exemplary graph of intensity of backscatter versus time for cloud conditions measurement system 40 of FIG. 3. The FIG. 3*a* graph depicts the detected amplitude of the projected light backscattered and received by the transmission fiber and detected by first optical detector 46. The detected amplitude is indicated by vertical axis 51 of the graph and time is indicated by horizontal axis 53 of the graph. The graph shows backscatter of a cloud atmosphere in a chamber enclosing system 40 and illustrates decreasing amounts of backscatter in system 40 until a reflection from wall 60 causes a spike in the graph.

FIG. 3*b* is an exemplary graph of intensity of transmitted laser beam versus time for cloud conditions measurement system 40 of FIG. 3. The FIG. 3*b* graph depicts the detected amplitude of the projected light as sampled by fiber 56 and detected by second optical detector 54. The detected amplitude is indicated by vertical axis 55 of the graph and time is indicated by horizontal axis 57 of the graph. The graph shows a sample of a transmitted laser beam in a chamber enclosing system 40 and illustrates transmission of the laser beam with a spike in the graph.

Figure 4:
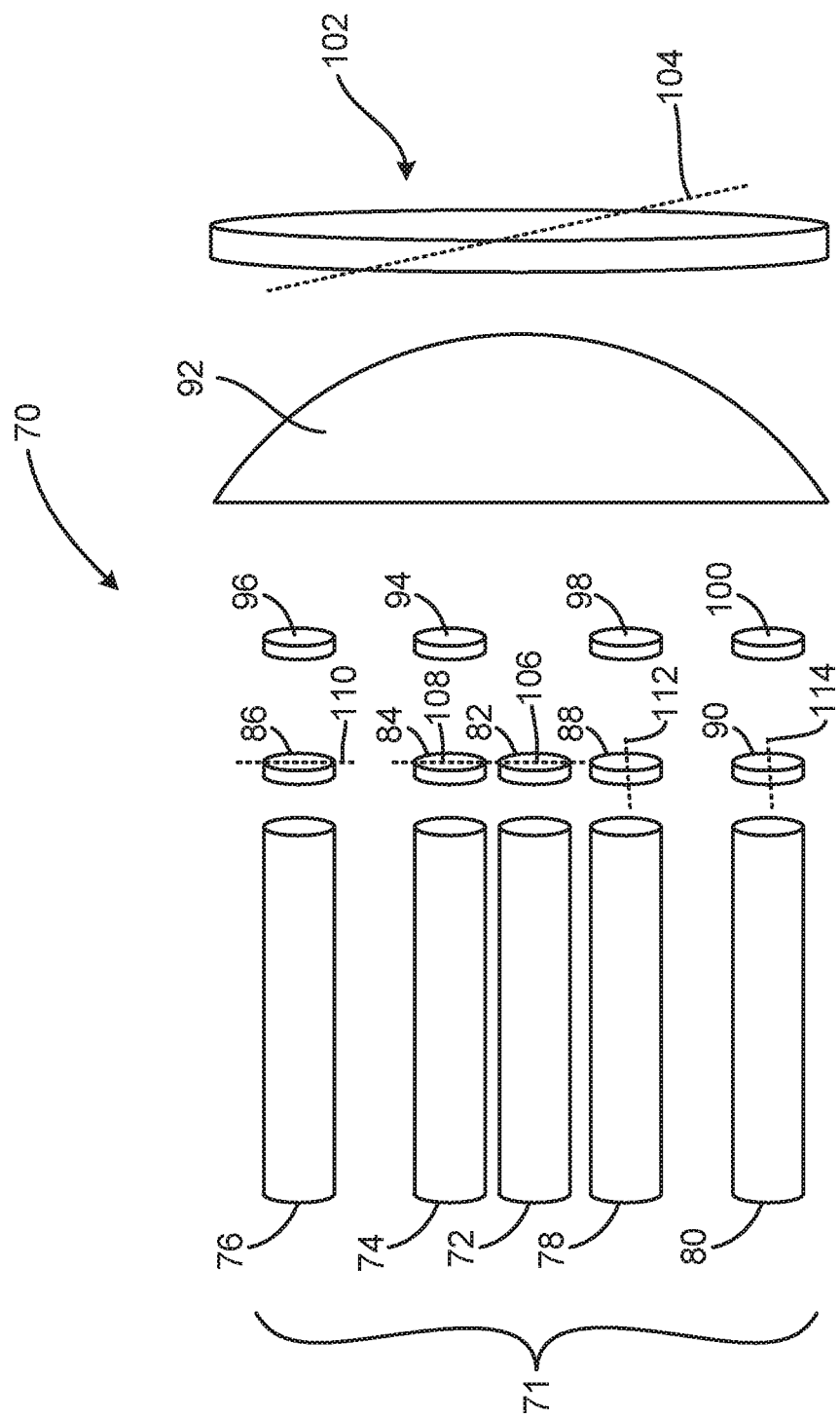
FIG. 4 is a schematic diagram of a further embodiment of a cloud conditions measurement system.
Figure 5:
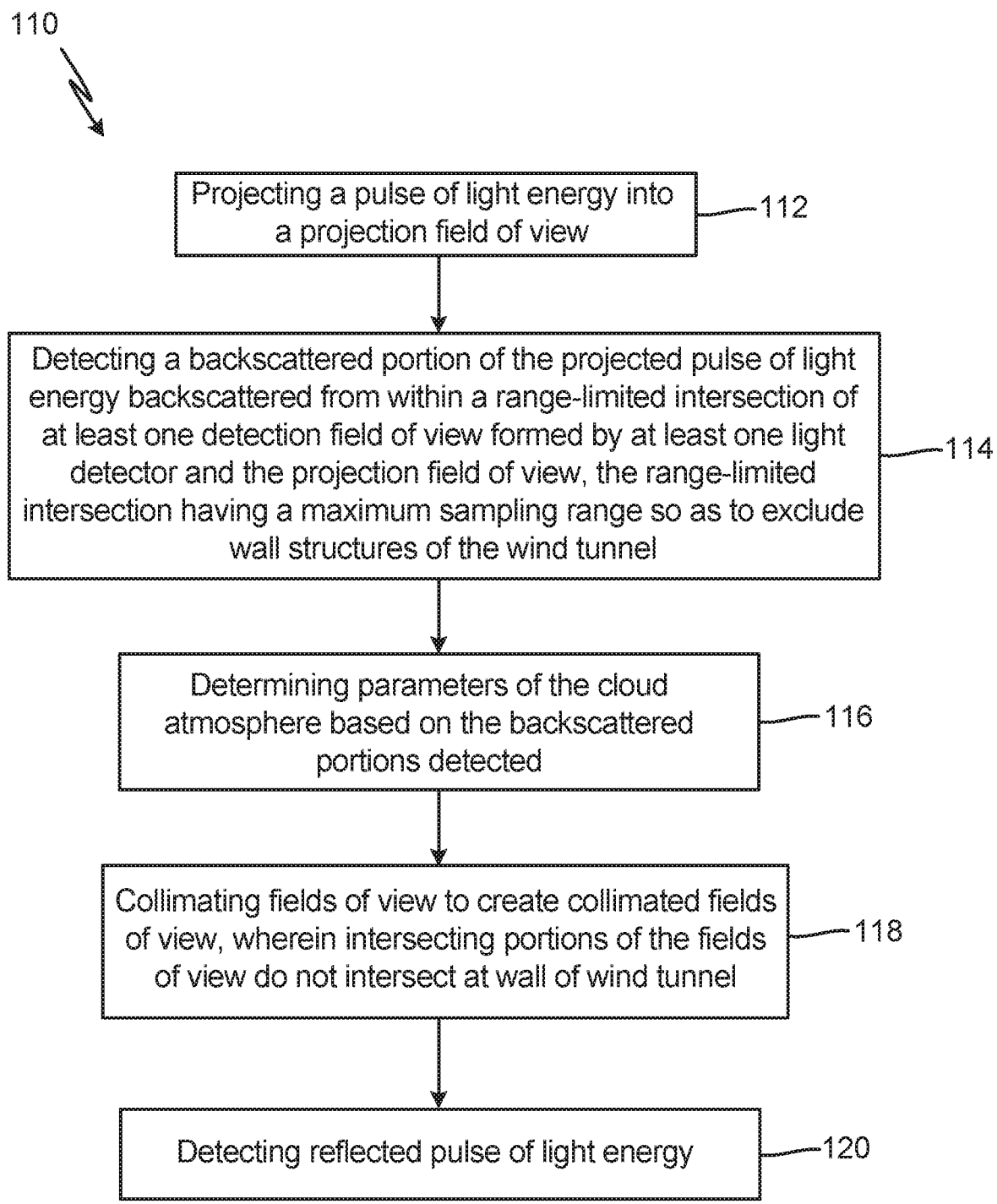
FIG. 5 is a flow chart of an exemplary method of measuring cloud conditions in a wind tunnel.

FIG. 4 is a schematic diagram of a portion of an exemplary cloud conditions measurement system 70. In FIG. 4, fiber bundle 71 includes laser transmitter fiber 72, first receiver fiber 74, second receiver fiber 76, third receiver fiber 78, and fourth receiver fiber 80. Laser transmitter fiber 72 and receiver fibers 74, 76, 78, 80 each have linear polarizers 82, 84, 86, 88, 90, respectively, aligned with them. Linear polarizers 84, 86 on first and second receiver fibers 74, 76, respectively, can be oriented parallel to linear polarizer 82 on laser transmitter fiber 72 and linear polarizers 88, 90 on third and fourth receiver fibers 78, 80, respectively, can be oriented perpendicularly to linear polarizer 82 on laser transmitter fiber 72. This paired combination of parallel and perpendicular linear polarizers for receiver fibers can be repeated for all desired receiver fiber off-set angles. System 70 can also include bandpass filters 94, 96, 98, 100, as shown, aligned with of each first, second, third and fourth receiver fibers 84, 86, 88, 90, respectively With no further polarization optics, a system including fiber bundle 71 can use linear polarization to detect the presence of depolarizing airborne particles, such as ice crystals or dust. System 70 also includes single collimation lens 92.

The depicted configuration of optical elements in fiber bundle 70 shows transmitter fiber 72 bundled with receiver fibers 74, 76, 78, 80. Transmitter fiber 72 is adjacent to and aligned parallel to receiver fibers 74, 76, 78, 80. The depicted arrangement of optical elements in FIG. 4 also depicts transmitter fiber 72 having substantially the same diameter as receiver fibers 74, 76, 78, 80. Such similarly sized fibers can provide similar fields of view for transmitter fiber 72 and receiver fibers 74, 76, 78, 80. Another advantage of the depicted configuration is that the resulting size of fiber bundle 71 is small, because of the compact arrangement of elements.

Optionally and/or additionally, system 70 can include quarter-wave plate 102 (i.e., quarter-wave film or coating on a window), for example. If quarter-wave plate 102 is included, a transmitted linearly polarized laser beam can be converted to a circularly polarized beam (right-handed or left-handed, depending on the orientation of fast-axis 104 with regard to the linear polarization axis 106), and receiver fibers 74, 76, 78, 80 can then detect orthogonal components of circularly polarized backscatter, rather than linearly polarized backscatter. Furthermore, if quarter-wave plate 102 is re-oriented with fast axis 104 parallel to linear polarization axis 106 of laser transmitter fiber 72, then no circular polarization may be induced. Thus, system 70 including fiber bundle 71 remains a linearly polarized sensor or system unless quarter-wave plate 102 is included and rotated 45 degrees then it may be converted from a linearly polarized to a circularly polarized system. Quarter-wave plate 102 is rotatable so as to provide a variable polarization of the transmitted laser beam. Rotation of a window, for example, that contains quarter-wave plate 102, in increments of 45 degrees, either continuously in one direction or in a repetitive reciprocating manner between two fixed orientations, can cause system 70, for example, to toggle between a linearly polarized and a circularly polarized system.

The change of the polarization scheme, as described with regards to FIG. 4, can be beneficial for particles that scatter light anisotropically. This type of light scattering can occur if depolarizing airborne particles maintain a particular orientation in the airstream. Hexagonal plate ice crystals, for example, tend to orient themselves with their flat faces perpendicular to the direction of drag from air flow. The orientation manifests itself clearly in the linear depolarization, especially if one of the linear axes is parallel to the airstream. The effect is less pronounced for circular depolarization, since the circularly polarized light does not have a fixed orientation with respect to Cartesian axes. Measuring both linear and circular depolarization, as well as measuring the backscatter at multiple angles, enables a system to sense cloud particle shape and size, as well as the optical density of a cloud.

FIG. 5 is a flow chart of an exemplary method of measuring cloud conditions in a wind tunnel. Method 110 begins at step 112 in a pulse of light energy is projected into a projection field of view. The pulse of light energy may be generated by a laser, for example, and the pulse of light energy may alternatively be referred to as a laser beam, pulse of optical energy, etc. The laser may alternatively be referred to, for example, as an optical transmitter. The generated pulse of light energy can be transmitted along a transmitter fiber, such as a laser transmitter fiber.

The pulse of light energy can be transmitted from a transmitting face, of a transmitter fiber, defining a projection field of view aligned about a projection axis, such that the pulse of light energy is projected into a cloud atmosphere within the wind tunnel.

Then, at step 114, a backscattered portion of the projected pulse of light energy backscattered from within a range-limited intersection of at least one detection field of view formed by at least one light detector and the projection field of view can be detected. The range-limited intersection can have a maximum sampling range so as to exclude wall structures of the wind tunnel.

A series of receiver fibers, in the detectors, can receive a portion of the transmitted pulse of light energy that is backscattered by the cloud atmosphere. Each receiver fiber can have a reception face defining a reception field of view aligned about a reception axis, the reception faces of the series of receiver fibers aligned at a corresponding series of increasing off-set angles (via lateral displacements in the focal plane of the collimating lens) with respect to the projection axis. Any number of receiver fibers is contemplated. Depending upon the off-set angle of each receiver fiber, backscatter signals are received accordingly, and can indicate cloud conditions. The backscatter signals can then be transmitted from receiver fibers to optical receivers.

The projection and reception (or detector) fields of view can be collimated so as to create fields of view projecting within the cloud atmosphere, wherein intersecting portions of the fields of view of the series of receiver fibers intersect the field of view of the transmitter fiber, and the intersecting portions do not include wall structures of the wind tunnel. The collimating step may be done through a single collimation lens. The single collimation lens can be configured and arranged such that the projected pulse of light energy is uncollimated before reaching the single collimation lens, and then when as it passes through the single collimation lens, the light energy is collimated. Next, the collimated pulse of light energy is projected into a cloud atmosphere in a wind tunnel.

Next, step 116 includes determining parameters of the cloud atmosphere based on the backscattered portions detected.

Optionally, the next step can include linearly polarizing the projected pulse of light energy and each of the received portions of the transmitted pulse of light energy. The linearly polarizing step may be carried out using a plurality of linear polarizing elements, and a first of the linear polarizing elements associated with a first of the plurality of receiver fibers can be arranged parallel to a transmitter fiber used in transmitting the pulse of light energy and a second of the linear polarizing elements associated with a second of the plurality of receiver fibers can be arranged perpendicular to the transmitter fiber. Additionally, or alternatively, the next step can include circularly polarizing each of the received portions of the transmitted pulse of light energy. The circularly polarizing step can be carried out using a quarter-wave plate and can be performed by rotating the quarter-wave plate in order to carry out the circularly polarizing step. The quarter-wave plate may be rotated 45 degrees back and forth to toggle between circular and linear polarization.

Additional steps may be included in method 110. For example, detected received signals may be provided to a processor after being detected. The processor may include calculators, for example, such as a received backscatter signal to droplet size distribution calculator, an ice/liquid phase calculation engine, and an average cloud extinction calculator. The processor may also generate a communication signal, based on the received calculated cloud metrics, and send the communication signal to an optical transmitter to generate new pulses of light energy.

The following are non-exclusive descriptions of possible embodiments of the present invention.

A system for determining parameters of a cloud atmosphere within a wind tunnel, the system includes a light projector configured to project a pulse of light energy into a projection field of view. The system includes at least one light detector having a detection field of view that forms a range-limited intersection with the projection field of view, the range-limited intersection having a maximum sampling range so as to exclude wall structures of the wind tunnel, wherein the at least one light detector is configured to detect a backscattered portion of the projected pulse of light energy backscattered from within the range-limited intersection. The system also includes a cloud parameter calculator configured to determine parameters of the cloud atmosphere based on the backscattered portions detected.

A further embodiment of the foregoing system. wherein the projection field of view does not have a limit to its range within the wind tunnel.

A further embodiment of any of the foregoing systems, wherein the at least one light detector comprises multiple light detectors that each have an additional detection field of view that is different from the detection field of view from any other of the multiple light detectors, wherein each additional detection field of view forms a range-limited intersection with the projection field of view and each additional detection field of view.

The system of any of the preceding paragraphs can optionally include, additionally and/or alternatively, a lens configured and arranged to collimate the projection field of view and the at least one detector field of view as to create collimated fields of view.

A further embodiment of any of the foregoing systems, wherein at least a portion of the collimated fields of view of the at least one detector intersect the collimated projection field of view.

The system of any of the preceding paragraphs can optionally include, additionally and/or alternatively, a laser configured to generate the pulse of light energy, and a transmitter fiber configured to project the generated pulse of light energy from a transmitting face defining the projection field of view aligned about a projection axis into a cloud atmosphere within the wind tunnel.

A further embodiment of any of the foregoing systems, wherein the at least one detector comprises a receiving fiber.

The system of any of the preceding paragraphs can optionally include, additionally and/or alternatively, a single lens, wherein the at least one detector comprises multiple detectors each comprising a receiving fiber that is arranged and spaced along the single lens.

The system of any of the preceding paragraphs can optionally include, additionally and/or alternatively, a light detector configured to detect a backscattered portion of the projected pulse of light energy backscattered from outside the range-limited intersection.

A system for determining parameters of a cloud atmosphere within a wind tunnel, the system includes a light projector configured to project a pulse of light energy into a projection field of view. The system includes multiple light detectors each having a receiver fiber and a detection field of view that forms a range-limited intersection with the projection field of view, the range-limited intersection having a maximum sampling range so as to exclude wall structures of the wind tunnel, wherein the multiple light detectors are configured to detect a backscattered portion of the projected pulse of light energy backscattered from within the range-limited intersection. The system also includes a single collimation lens, wherein reception faces of the receiver fibers of the multiple light detectors are arranged along the single collimation lens, and a cloud parameter calculator configured to determine parameters of the cloud atmosphere based on the backscattered portions detected.

The system of the preceding paragraph can optionally include, additionally and/or alternatively, a plurality of linear polarizing elements each configured to linearly polarize the projected pulse of light energy and at least one of the backscattered portions of the projected pulse of light energy received by at least one of the receiver fibers.

The system of any of the preceding paragraphs can optionally include, additionally and/or alternatively, a circular polarizing element configured to polarize the projected pulse of light energy and arranged such that the projected pulse of light energy passes through the single collimation lens prior to being projected through the circular polarizing element and into the cloud atmosphere.

A method for determining parameters of a cloud atmosphere within a wind tunnel. The method includes the step of projecting a pulse of light energy into a projection field of view. The method also includes the step of detecting a backscattered portion of the projected pulse of light energy backscattered from within a range-limited intersection of at least one detection field of view formed by at least one light detector and the projection field of view, the range-limited intersection having a maximum sampling range so as to exclude wall structures of the wind tunnel. The method further includes the step of determining parameters of the cloud atmosphere based on the backscattered portions detected.

The method of any of the preceding paragraphs can optionally include, additionally and/or alternatively, the step of collimating the projection field of view and the at least one detector field of view so as to create collimated fields of view projecting into the cloud atmosphere.

A further embodiment of any of the foregoing methods, wherein the at least one light detector includes multiple light detectors each having a receiver fiber and the detection field of view of each of the multiple light detectors that forms the range-limited intersection with the projection field of view, and the multiple light detectors are configured to detect a backscattered portion of the projected pulse of light energy backscattered from within the range-limited intersection.

A further embodiment of any of the foregoing methods, wherein each receiver fiber has a reception face that is arranged along a single collimation lens.

A further embodiment of any of the foregoing methods, wherein the single collimation lens is configured and arranged so as to span and collimate the projection field of view and the at least one detector field of view.

The method of any of the preceding paragraphs can optionally include, additionally and/or alternatively, the step of transmitting the pulse of light energy from a transmitting face of a transmitter fiber defining the projection field of view aligned about a projection axis, such that the pulse of light energy is projected into the cloud atmosphere within the wind tunnel.

The method of any of the preceding paragraphs can optionally include, additionally and/or alternatively, the step of linearly polarizing the projected pulse of light energy and the backscattered portion.

The method of any of the preceding paragraphs can optionally include, additionally and/or alternatively, the step of circularly polarizing the projected pulse of light energy and the backscattered portion.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for determining parameters of a cloud atmosphere within a wind tunnel, the system comprising:
    a single collimating lens having a projection axis;
    a light projector configured to project a pulse of light energy from a projection fiber aligned along the projection axis through the single collimating lens into a projection field of view;
    a light detector array configured to detect the pulse of light backscattered by the cloud atmosphere focused by the single collimating lens upon a plurality of receiving faces of a corresponding plurality of receiver fibers aligned off-axis from the projection axis, each of the plurality of receiver fibers aligned at different off-axis distances from projection fiber thereby receiving light backscattered at a plurality of different angles, thereby forming different detection fields of view that have different range-limited intersections with the projection field of view, the range-limited intersections having different maximum sampling ranges that exclude wall structures of the wind tunnel, thereby permitting detection of portions of the projected pulse of light energy backscattered only from within the range-limited intersections; and a cloud parameter calculator configured to determine sizes and shapes of particles within the cloud atmosphere based on the backscattered portions detected and the plurality of different angles at which the light is backscattered.

2. The system of claim 1, wherein the projection field of view does not have a limit to a projection range within the wind tunnel.

3. The system of claim 1, wherein the single collimation lens is configured and arranged to collimate the projection field of view and the detection fields of view as to create collimated fields of view.

4. The system of claim 3, wherein at least a portion of the collimated detection fields of view intersect the collimated projection field of view.

5. The system of claim 1, further comprising:
a laser configured to generate the pulse of light energy; and
a transmitter fiber configured to project the generated pulse of light energy from a transmitting face defining the projection field of view aligned about the projection axis into the cloud atmosphere within the wind tunnel.

6. The system of claim 1, further comprising:
a receiver fiber configured to detect a backscattered portion of the projected pulse of light energy backscattered from outside the range-limited intersection.

7. The system of claim 1, further comprising:
a plurality of linear polarizing elements each configured to linearly polarize the projected pulse of light energy and at least one of the backscattered portions of the projected pulse of light energy received by at least one of the plurality of receiver fibers.

8. The system of claim 1, further comprising:
a plurality of circular polarizing elements configured to polarize the projected pulse of light energy and at least one of the backscattered portions of the projected pulse of light energy received by at least one of the plurality of receiver fibers.

9. A method for determining parameters of a cloud atmosphere within a wind tunnel, the method comprising:
projecting a pulse of light energy from a projection fiber into a projection field of view;
collimating the projection field of view via a single collimation lens having a projection axis aligned with the projection fiber, so as to create a collimated projection field of view projecting into the cloud atmosphere;
detecting a portion of the projected pulse of light energy backscattered from within range-limited intersections of a plurality of detection fields of view and the projection field of view, the detection fields of view formed by the plurality of receiver fibers aligned at different off-axis distances from the projection fiber, thereby receiving light backscattered at a plurality of different angles, thereby forming different range-limited intersections with the projection field of view, the range-limited intersections having different maximum sampling ranges that exclude wall structures of the wind tunnel, thereby permitting detection of portions of the projected pulse of light energy backscattered only from within the range-limited intersections;
collimating the plurality of detection fields of view, via the single collimation lens, so as to create collimated detection fields of view; and
determining sizes and shapes of particles within the cloud atmosphere based on the backscattered portions detected and the plurality of different angles at which the light is backscattered.

10. The method of claim 9, wherein the single collimation lens is configured and arranged so as to span and collimate the projection field of view and the plurality of detection fields of view.

11. The method of claim 9, further comprising:
transmitting the pulse of light energy from a transmitting face of a transmitter fiber defining the projection field of view aligned about the projection axis, such that the pulse of light energy is projected into the cloud atmosphere within the wind tunnel.

12. The method of claim 9, further comprising:
linearly polarizing the projected pulse of light energy and the backscattered portion.

13. The method of claim 9, further comprising:
circularly polarizing the projected pulse of light energy and the backscattered portion.

* * * * *